United States Patent [19]

Love

[11] 4,272,369
[45] Jun. 9, 1981

[54] LIQUID TREATMENT APPARATUS

[75] Inventor: Leonard S. Love, Mississauga, Canada

[73] Assignee: Sydlo Inc., Mississauga, Canada

[21] Appl. No.: 103,310

[22] Filed: Dec. 13, 1979

[51] Int. Cl.³ .......................................... B01D 21/08
[52] U.S. Cl. ................................ 210/137; 210/195.3; 210/208; 210/219; 210/530
[58] Field of Search .............. 210/20, 46, 137, 195.1, 210/195.3, 195.4, 197, 199, 207, 208, 219, 530

[56] References Cited

U.S. PATENT DOCUMENTS

| | | | |
|---|---|---|---|
| Re. 21,109 | 6/1939 | Sayers et al. | 210/530 X |
| 1,076,666 | 10/1913 | Dorr | 210/197 X |
| 2,190,596 | 2/1940 | Dorr | 210/195.1 X |
| 2,289,112 | 7/1942 | Fischer | 210/197 |
| 2,353,358 | 7/1944 | Prager | 210/20 |
| 2,649,412 | 8/1953 | Kivari et al. | 210/197 |
| 2,669,357 | 2/1954 | Kivell et al. | 210/197 |
| 2,838,180 | 6/1958 | Lawlor | 210/208 X |
| 3,228,526 | 1/1966 | Ciabattari et al. | 210/195.1 X |
| 3,306,449 | 2/1967 | Minegishi | 210/195.1 X |
| 3,473,665 | 10/1969 | Duff | 210/195.1 X |
| 3,487,017 | 12/1969 | Thorn et al. | 210/46 |
| 3,517,814 | 6/1970 | Minegishi | 210/197 |
| 3,929,640 | 12/1975 | Dohnert | 210/195.4 |
| 4,136,012 | 1/1979 | Louboutin et al. | 210/208 |

FOREIGN PATENT DOCUMENTS 2752296  5/1970  Fed. Rep. of Germany ........ 210/195.4

Primary Examiner—Robert H. Spitzer
Attorney, Agent, or Firm—Rogers, Bereskin & Parr

[57] ABSTRACT

The disclosure relates to a liquid treatment apparatus which includes a clarifier tank and an integral sludge thickener tank. Liquid enters the clarifier tank through an inlet member disposed generally centrally of the bottom wall of the member and passes upwardly through an eductor member into a mixing zone defined by a reaction cone. Recirculation of liquid and suspended particles below the cone promotes flocculation of those particles. Gravity settling also takes place in the relatively quiescent area outside the cone. The liquid inlet member is of divergent cross-sectional shape for dissipating some of the energy in the liquid and a variable speed rotary impeller is disposed in the inlet and can be adjusted to control liquid circulation according to the flow rate of influent liquid. The apparatus also includes an integral sludge thickener tank to which sludge and liquid are continuously delivered from the clarifier tank. Clarified water from the thickener is returned to the clarifier tank and the effluent from the thickener tank is discarded.

15 Claims, 3 Drawing Figures

LIQUID TREATMENT APPARATUS

This invention relates to an apparatus for the treatment of liquids to remove suspended solids.

In the purification of water or waste liquid (domestic sewage or industrial waste water) it is customary to add certain chemical flocculants (e.g. alum) to the liquid being treated to produce a mass of gelatinous suspended particles commonly called "floc particles". These particles are encouraged to grow in size during a period of mixing, coagulation and flocculation. The "floc particles" combine with suspended matter in the liquid being treated to produce a dense floc which can be removed by gravity settling in a clarifier.

Normally, the liquid being treated is conveyed from its source (e.g. river, lake, industrial plant, municipal sewer) to the treatment facility by conventional pumping equipment. However, since the liquid must be relatively quiescent in the clarifier all of the energy imparted to the liquid by the pumping equipment must be completely dissipated before it enters the clarifier.

The U.S. patent literature contains several examples of liquid treatment apparatus in which flocculation and gravity settling are said to take place in the same tank. An early example of this type of apparatus is shown in U.S. Pat. No. 2,268,726 to Tark. In that case, flocculation is induced by means of a high speed paddle-type mixer. Scraper chains are employed to remove settled sludge from the bottom of the tank. U.S. Pat. Nos. 3,473,665 (Duff) and 3,929,640 (Dohnert) show examples of water treating apparatus in which rotary scraper assemblies are used for scraping settled sludge from the bottom of a settling tank. In each case, the scraper assembly includes a vertical shaft for driving scraper arms which sweep over the bottom wall of the tank. Water is introduced through a series of annular nozzles arranged around the shaft. However, it is believed that this annular nozzle arrangement would not be effective in producing the mixing action which is required to induce satisfactory flocculation.

An object of one aspect of the present invention is to provide an improved liquid treatment apparatus in which flocculation and gravity settling can take place in the same tank and in which the gentle turbulent mixing required for efficient flocculation can be achieved by taking advantage of the energy ordinarily available in the influent water. Another aspect of the invention has for its object to provide a liquid treatment apparatus which is designed to reduce wastage of the liquid being treated due to dilute sludge blow down.

According to a first aspect of the invention there is provided a liquid treatment apparatus which includes a tank for containing a body of liquid, a conduit through which liquid containing suspended particles can be delivered to the tank, and liquid outlet means disposed generally at the level of the surface of said body of liquid and through which clarified liquid can leave the tank. Sludge outlet means is provided in a bottom wall of the tank, through which particles which have settled out of the liquid can be removed as a sludge. Sludge conveyor means is also provided and is operable to convey settled particles towards the slude outlet means. An inlet member is disposed at an inner end of the liquid conduit adjacent the bottom wall of the tank and is arranged to direct influent liquid generally vertically upwards in the tank. The inlet includes generally coaxially inner and outer portions each of tubular form extending about a common axis and through which the liquid flows from end to end. The outer portion of the inlet member is of significantly greater cross-sectional area than the inner portion of the member and defines a discharge end of the inlet so that some of the energy in the liquid flowing through the inlet member is dissipated as the liquid flows from the inner portion to the outer portion of the member. Static mixer means is disposed in the inner portion of the inlet. Feed means is also provided and is adapted to permit introduction of chemical additives into influent liquid immediately upstream of static mixer. A generally conical partition member is disposed in the tank above the inlet and defines a circulation zone below the member, the remainder of the tank outside the partition member defining a relatively quiescent zone for gravity settling of suspended particles. A tubular eductor member having open upper and lower ends is disposed in an upright position below the partition member and generally in alignment with the liquid inlet. The eductor member is arranged relative to the inlet so that liquid entering the tank from the inlet flows upwardly in the eductor member and through the upper end of the member into said circulation zone, and liquid and suspended particles adjacent said open lower end of the eductor member are entrained by said upward flow of liquid so that a recirculation of liquid and suspended particles is established below the partition member for promoting flocculation of said particles. Rotary impeller means is disposed adjacent said discharge end of the inlet in the path of liquid flowing through the inlet and is adapted to control circulation of liquid and suspended particles in said circulation zone.

According to another aspect of the invention, the liquid treatment apparatus includes a clarifier tank for containing a body of liquid extending to a pre-determined level in the tank, an inlet for liquid containing suspended particles, and liquid outlet means disposed generally at said pre-determined liquid level and through which clarified liquid can leave the tank. Means is provided in the tank for promoting settling of said particles from the liquid. A bottom wall of the tank includes a sump for receiving settled particles in the form of a sludge. Sludge conveyor means is provided and is operable to convey settled particles towards said sump. A thickener tank is closely associated with the clarifier tank and has a clarified liquid outlet adjacent an upper end of the tank, a sludge outlet adjacent a lower end of the tank through which settled sludge can be periodically removed from the apparatus, and an inlet intermediate said outlets. The inlet and outlets are below said predetermined liquid level in the clarifier tank. A conduit extends from the clarifier tank sump to the thickener tank inlet so that the head of liquid in the clarifier tank above the sump causes sludge and liquid to continuously flow from the sump into the thickener tank, and causes clarified liquid to flow continuously from the thickener tank liquid outlet. Means is provided in the thickener tank for promoting thickening of particles in liquid in the tank. Means is also provided coupling the clarified liquid outlet of the thickener tank to either the inlet or liquid outlet means of the clarifier tank. Means may also be provided to introduce chemicals into the conduit to enhance the dewatering chacteristics of the sludge and liquids.

In order that the invention may be more clearly understood, reference will now be made to the accompanying drawings which illustrate a preferred embodiment of the invention by way of example, and in which.

Figure 1:
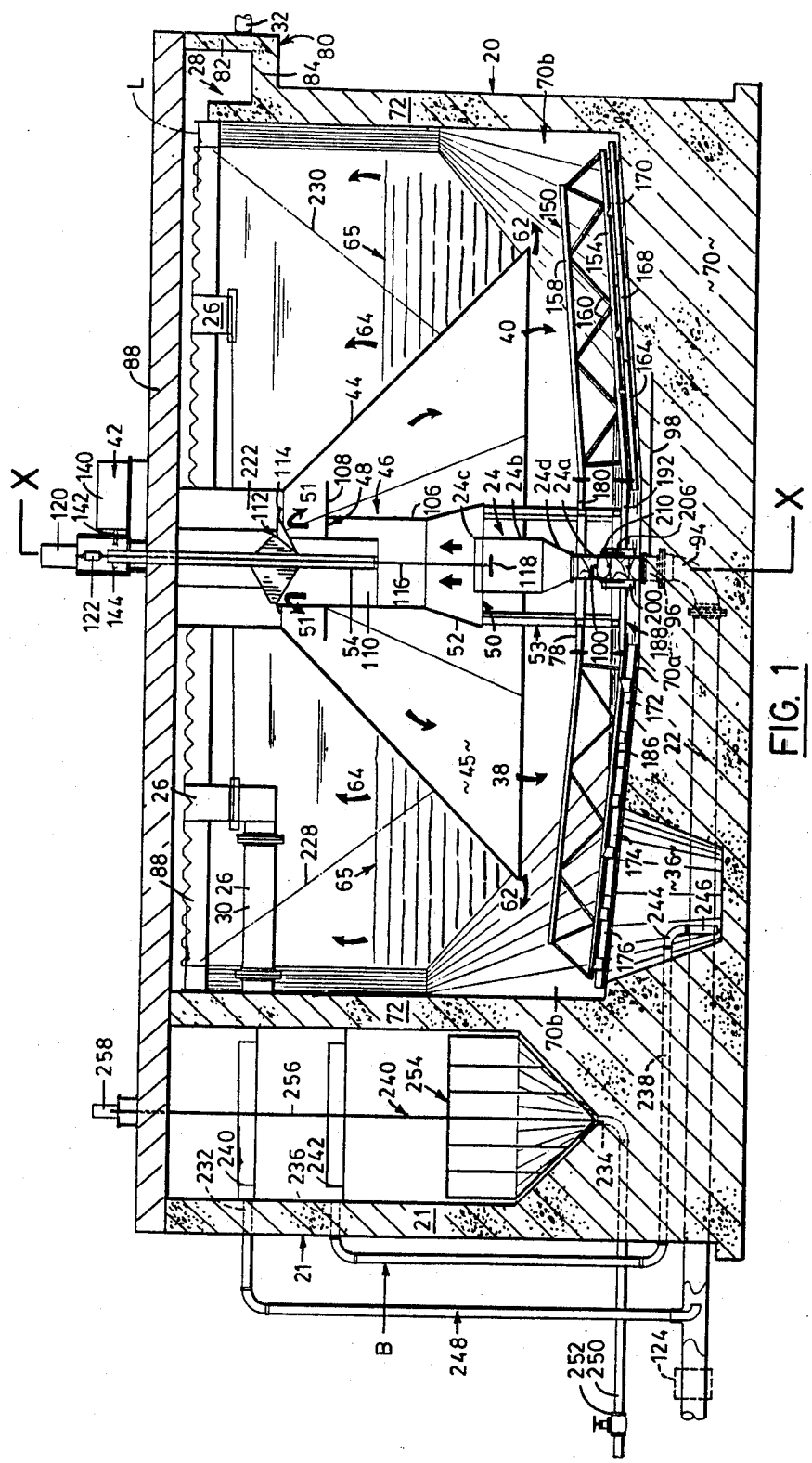
FIG. 1 is a vertical sectional view through a liquid treatment apparatus according to the invention.

The apparatus shown in the drawings has been designed primarily as part of a water purification plant; accordingly, the description which follows will relate specifically to this application of the invention although it is to be understood that the principles involved will be applicable to the purification of other liquids, including municipal sewage and industrial waste water.

Figure 2:
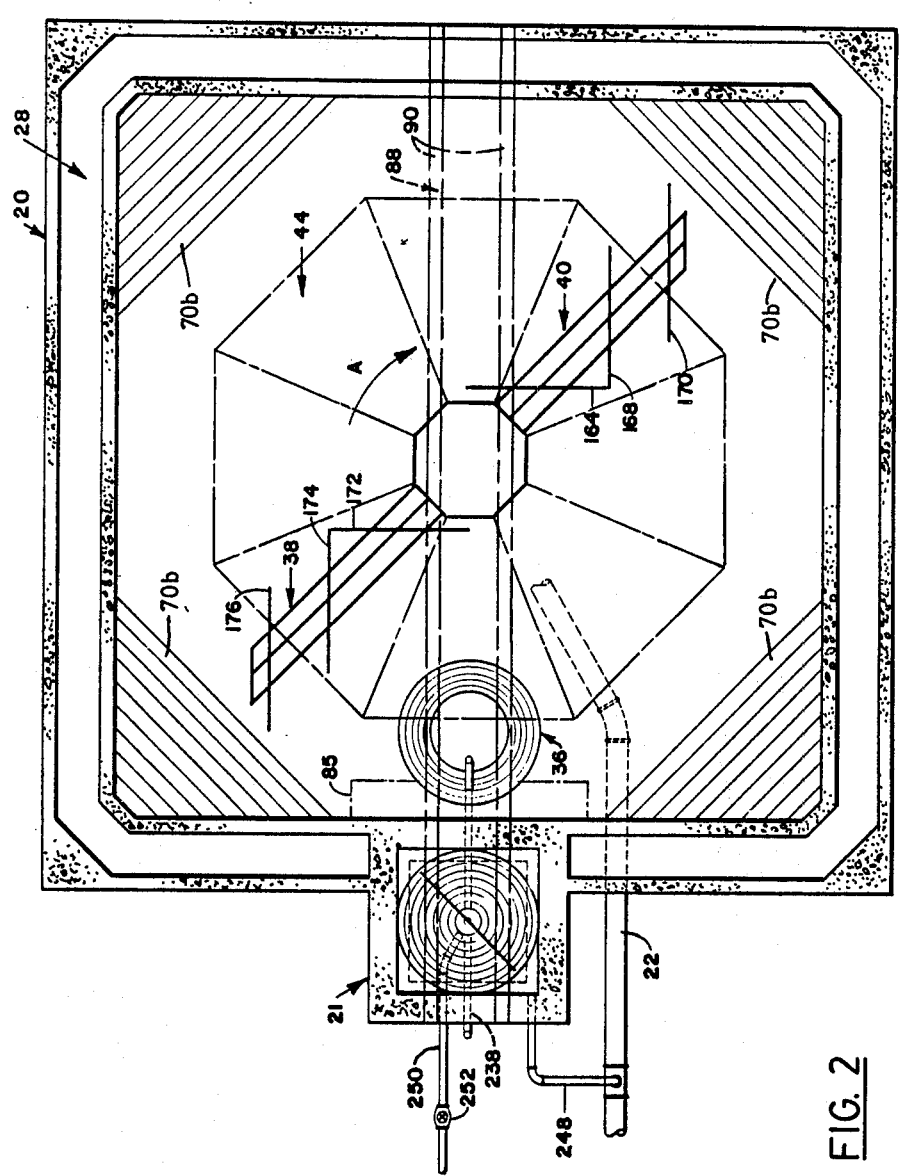
FIG. 2 is a plan view corresponding to FIG. 1.

Referring first to FIGS. 1 and 2, the apparatus includes a concrete clarifier tank 20 of generally square shape for containing a body of water to a level indicated by reference character L. A thickener tank is integrally formed with tank 20 and is generally indicated by reference numeral 21. Water to be clarified enters the clarifier tank 20 through a raw water inlet pipe 22 from a pumping installation (not shown). Pipe 22 terminates inside the tank at a vertically arranged inlet 24 in the form of a nozzle. Clarified water leaves the tank by way of inner and outer launders 26 and 28 respectively connected by a pipe 30. A treated water output pipe 32 extends outwardly from launder 28. Floc particles which settle from the water in the clarifier tank are collected in sump 36. A sludge scraper assembly conveys settled sludge towards sump 36 and includes two scraper arms 38 and 40 mounted for rotation about a vertical axis denoted X—X in FIG. 1. An electric drive unit 42 is provided for rotating the scraper arms as will be described.

A generally conical partition member 44 extends about axis X—X and is disposed in tank 20 above inlet nozzle 24, defining a liquid recirculation zone below the member. Member 44 is referred to as a reaction cone and defines a mixing, coagulation and flocculation zone 45 therebelow. Disposed inside cone 44 is a tubular eductor member 46 which also extends about axis X—X and which is positioned generally in alignment with nozzle 24 so that water entering the tank through the nozzle will flow upwardly in the eductor. The eductor has an open upper end 48 through which water enters zone 45 and an open lower end 50. The open lower end 50 of eductor 46 is disposed relative to inlet nozzle 24 so that water entering the eductor from the nozzle entrains surrounding water and suspended particles and a circulation pattern is established below the clarifier reaction cone 44 as indicated by the arrows 51 in FIG. 1. In this particular embodiment a deflection baffle (see later) is provided above the open upper end 48 of the eductor member for laterally diverting liquid leaving the member into said circulation pattern as will be more specifically described later.

At its lower end, eductor 46 has a generally conical inlet 52. A frame generally denoted 53 depends from inlet 52 and carries the scraper arms 38 and 40 as will be described. A tubular driving member 54 extends vertically upwardly from eductor 46 and is attached at its upper end to drive unit 42. Thus, it will be appreciated that the eductor forms part of the sludge scraper assembly and that rotary motion imparted to member 54 by unit 42 will be transmitted to the scraper arms by way of the eductor.

The eductor 46 and reaction cone 44 are designed to allow substantially unrestricted recirculation of the water below the reaction cone and promote a high degree of mixing flocculation and sludge recirculation which in turn maintains a high concentration of floc particles under the cone. Cone 44 confines the turbulent water to the liquid recirculation zone defined by the cone while the water in the remainder of the tank is in the relatively quiescent state required for good settling.

Raw water continuously enters tank 20 from inlet pipe 22. As a result, a mixture of floc particles and water is continuously expelled around the bottom edge of cone 44, as indicated by arrow 62 in FIG. 1. Heavier, larger particles settle out and fall to the bottom of tank 20. The lighter, smaller particles will rise as indicated by arrows 64. Because of the shape of the cone 44 the area available for settling (i.e. outside the cone) increases as the smaller particles rise. This increase in settling area reduces the upward velocity of the smaller, lighter floc particles and permits them to settle out at a higher level in tank 20. This action effectively forms a suspended blanket of floc particles with the larger suspended particles at the bottom and the smaller, lighter particles at the top. This blanket, denoted 65 is referred to as a suspended sludge blanket.

The suspended sludge blanket 65 acts as a filter medium through which the water is in effect filtered as it flows upwards towards the launder 28. Coagulation and entrapment of smaller particles continues to take place within the suspended sludge blanket 65 and causes them to grow in size and improves their settling ability. Through this action the smaller particles find their way to the bottom of the suspended sludge blanket to the point where they settle out on the floor of tank 20, and are removed by sludge scraper 38 and 40 to the sump.

Referring to the drawings in more detail, it will be seen that tank 20 has a bottom wall 70 having a circular central portion 70a which is "swept" by the sludge scraper assembly and downwardly sloping corner portions 70b. The top surface portion 70a slopes towards inlet 24. Sidewalls 72 extend vertically upwardly from wall 70 to define the generally rectangular shape of the clarifier tank as can best be seen in FIG. 2. Adjacent their upper ends, the sidewalls 72 are formed with integral channel-shaped formations 80, each having an outer limb 82 and a lower, inner limb 84. The channel-shaped formations 80 merge with one another to define a trough around the top of the tank which forms the launder 28. The trough is continuous except at the position of the thickener tank 21 (see FIG. 2). However, an auxiliary launder such as that indicated in ghost outline at 85 may be provided at this position if required. Weir plates such as those indicated at 86 in FIG. 1 are bolted to the inside surfaces of the inner limbs 84 of the formations 80 so as to protrude above the tops of the limbs and define the water level in the tank. The weir plates 86 are of conventional form and have saw-tooth shaped upper edges over which the water spills. This edge shaping has been found to be preferable since it avoids leveling problems which are found to occur with straight edged weir plates. The treated water outlet pipe 32 extends through the outer limb 82 of one of the formations 80 for conveying treated water from the apparatus.

A main support beam 88 (indicated in ghost outline only in FIG. 2) extends across the tank 20 and is supported on the limbs 82 of the channel-shaped formations 80 of the sidewalls (see FIG. 1). Beam 88 is in fact formed by two parallel channel section members 90 which define respectively opposite sides of the beam.

Beam 88 supports the sludge scraper assembly and the clarifier reaction cone 44 of the apparatus as will be described. The beam also provides a walkway for maintenance personnel across the top of the tank. Suitable handrails and tread plates will be provided for safety purposes but are not shown in the drawings.

The raw water inlet pipe 22 of the apparatus is embedded in the bottom wall 70 of the clarifier tank and includes a 90° elbow 94. Nozzle 24 is fitted to elbow 94 with the inter-position of feed means adapted to permit introduction of chemical additives into influent liquid. These means are in fact formed by a fitting 96 interposed between elbow 94 and nozzle 24. A pipe 98 extends into fitting 96 through the bottom wall of the clarifier tank and chemicals can be introduced into the fitting through this pipe.

In accordance with the invention, nozzle 24 includes generally co-axial inner and outer portions denoted 24a and 24b respectively each of tubular form extending about a common axis and through which liquid flows from end to end. In this particular embodiment, the two portions are in fact of cylindrical shape. The outer end portion is of significantly greater cross-sectional area than the inner end portion and defines a discharge end 24c of the inlet nozzle. Thus, it will be seen that the nozzle is in fact of generally divergent cross-sectional shape in the direction of liquid flow. This has the effect of dissipating some of the energy in the liquid flowing through the nozzle. The nozzle also includes an outwardly flared conical portion 24d interposed between the inner and outer portions for providing a smooth transition between the two portions.

A static mixer generally indicated at 100 is provided in the inner portion 24a of nozzle 24. This mixer is of a form conventionally used in liquid conduits and comprises a number of stationary vanes which impart a swirling motion to the liquid so as to promote good mixing. Thus, chemicals introduced in fitting 96 immediately upstream of the mixer 100 are intimately mixed into the liquid stream in passing through the inner portion 24 of the nozzle. These chemicals may, for example, be a prime coagulant (e.g. alum) or a long chain hydrocarbon known as "polyelectrolyte" which tends to cause pin point floc particles to adhere to one another to form larger particles. Nozzle 24 terminates inside the generally conical inlet portion 52 of the eductor of 46. The eductor is a sheet metal fabrication designed to provide a venturi-like throat just downstream of the discharge end of nozzle 24. This throat is formed by the junction of inlet portion 52 with a generally cylindrical section 106 of the eductor which is of constant cross-sectional shape throughout its length. At its lower end, section 106 is connected to the conical inlet portion 52 of the eductor, while at its upper end the section is connected to an outwardly projecting flange 108.

It will be appreciated from the foregoing that as water is discharged from nozzle 24 into the eductor, it enters the eductor throat at high velocity and causes water and suspended floc particles in the vicinity of the eductor inlet to be entrained and drawn up through the eductor with the incoming water to establish a recirculatory flow as described previously.

Eductor 46 is symmetrical about axis X—X. The vertical driving member 54 from the drive unit 42 is also disposed on axis X—X and extends down a substantial distance into the top eductor section 106. Member 54 is coupled to section 106 by three plates, two of which are indicated at 110 in FIG. 1 which are equiangularly disposed about axis X—X and are disposed in planes which radiate outwardly from the axis. The plates are welded both to member 54 and to the inner surface of section 106.

The support plates 100 project a substantial distance above eductor section 106 and terminate at a top member 112 (see FIG. 3) which defines the deflection baffle referred to above. Member 112 is of inverted conical shape and has a downwardly inclined lip 114 around its periphery. Due to its inverted conical shape member 112 serves to deflect outwardly water and floc particles rising in the eductor section 106 and assists in establishing the recirculatory pattern below the clarifier reaction cone as discussed above. In other words, water travelling upwardly in the eductor will pass between the support plates 110 and be deflected outwardly through the space between the top member 112 and the flange at the top of eductor member 106.

Extending vertically downwardly through the tubular driving member 54 is a drive shaft 116 for a rotary impeller 118 disposed adjacent the discharge end of the inlet nozzle 24 in the path of liquid flowing through the nozzle. The impeller controls circulation of liquid and suspended particles below cone 44. In this particular embodiment, a marine type impeller is used. Although not essential, this form of impeller is to be preferred because of its low-shear characteristics, which assist in promoting the formation of floc particles. Drive shaft 116 projects above the upper end of the driving member 54 and is coupled at its end to a drive motor 120 supported on the beam 88 at the top of the tank. Associated with the motor is a gear box 122 for providing a relatively low rotary output speed for driving shaft 116. Motor 120 is a variable speed motor so that the speed of the impeller 118 can be controlled according to the flow rate of liquid entering the clarifier tank through nozzle 24. Thus, it has been found that, by adjusting the speed of impeller 118 according to the flow rate of incoming liquid, substantially constant flocculating conditions can be maintained in the clarifier tank irrespective of the fluctuations of influent flow rates which are found to occur in practice. In fact, a flow measuring device such as that indicated in ghost outline at 124 in FIG. 1 may be incorporated in the raw water inlet pipe 22 and may be coupled to impeller drive motor 120 through control circuitry designed to automatically vary the speed of the impeller in accordance with flow conditions in pipe 22.

The combination of an inlet nozzle 24 of devergent cross-sectional shape and impeller means adjacent the discharge end of the nozzle is believed to be a very significant factor in the advantages achieved by the present invention. Thus, the divergent nozzle dissipates some of the energy in the influent liquid and ensures that, at the highest flow rates, the liquid does not cause undue turbulence inside the clarifier which might otherwise be so vigorous as to tend to destroy floc particles rather than encourage their formation. At the same time, the impeller 118 may be considered to compensate for the loss in circulation efficiency which comes with lower energy levels (low flow rates), making for good flocculating conditions at all rates.

The drive unit 42 for the sludge scrapers 38 and 40 is mounted on the main support beam 88 of the apparatus and comprises a combined electric motor and speed reducing gear box unit 140. The gear box drives a gear wheel 142 which meshes with a further gear 144 connected to the upper end of the coupling tube 124. The drive unit is designed to rotate the driving member 54 of the sludge scraping assembly at a relatively slow speed so as to cause the scraper arms 38 and 40 to sweep slowly over the bottom wall of tank 20.

Figure 3:
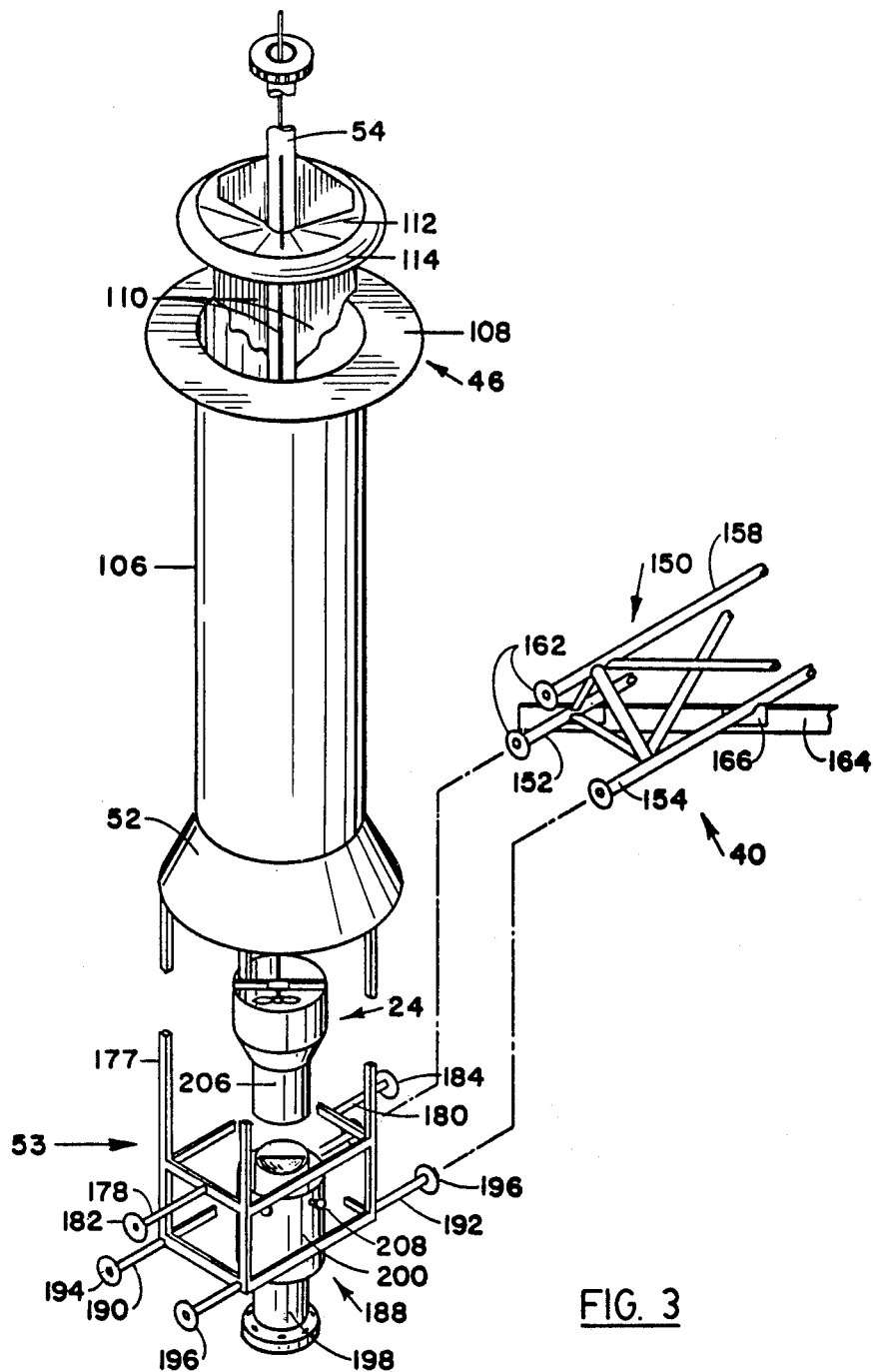
FIG. 3 is an exploded perspective view of part of FIG. 1.

As indicated previously, eductor 46 forms part of the sludge scraper assembly and the scraper arms 38 and 40 are connected to the generally conical inlet portion 52 of the eductor by way of a frame 53. Referring primarily to FIG. 3, it will be seen that part of the scraper arm 40 is visible in an exploded position adjacent the eductor. Since the two scraper arms are essentially the same only arm 40 will be described. The arm includes a frame 150 constructed from pipe and including three main longitudinal members 152, 154 and 158 arranged in a triangular configuration with two of the longitudinal members (152 and 154) defining the base of the triangle and the third member 158 at the top. Bracing struts generally denoted 160 extend between the longitudinal members. At their inner ends, the longitudinal members are each fitted with attachment flanges 162.

Frame 150 carries three scraper blades (see FIG. 2), one of which is visible at 164, and each of which is attached to the frame by mounting plate such as that indicated at 166 welded to one of the bottom longitudinal members of the frame. Each blade will in fact be provided with two mounting plates welded one to each of the bottom longitudinal frame members. The mounting plates are disposed in oblique positions with respect to the frame member on which they are mounted so that each scraper blade is angled with respect to the longitudinal direction of the arm. The other two scraper blades of arm 40 are visible in FIG. 2 and are denoted 168 and 170. Scraper arm 138 is essentially of similar construction and includes three scraper blades 172, 174 and 176.

It will be seen from FIGS. 1 and 2 that the sludge receiving sump 36 of the apparatus is offset from the centre of the clarifier tank and is in fact offset to one side, adjacent thickener tank 21. This has the advantage that the sump is located closely adjacent the thickener tank for transfer of sludge from the sump to the tank as will be described later. This location also has the advantage that the sump is disposed outside the turbulent central region of the clarifier tank below partition member 44. The direction of rotation of the scraper assembly is indicated by arrow A in FIG. 2 and it will be seen that the two outermost scraper blades on each arm (168 and 170—arm 40 and 174 and 176—arm 38) are angled so that their inner edges lead in the direction of rotation of the arms so that both blades will tend to convey settled sludge outwardly into sump 36. The inner arms are oppositely angled so that they will tend to convey sludge in their path inwardly towards the central flocculation zone of the clarifier tank. Thus, the particles which settle below the reaction cone 44 and hence in the path of the inner blades 172 and 174 tend to be lighter particles than those which settle outside the reaction cone and it is considered advantageous to tend to re-introduce those particles into the area below the reaction cone so that they will tend to be taken up by the circulating liquid and will assist in promoting further flocculation and coagulation.

Referring back to FIG. 3, the frame used to couple the scraper arms 38 and 40 to the eductor member 46 is generally indicated at 53. It will be seen that the frame is of generally box form and includes four upwardly extended frame members 177 which are welded to the eductor member at their upper ends. Two tubular coupling members 178 and 180 respectively project outwardly from frame 53 and are coupled at their outer ends to the top longitudinal members of the scraper arms (as member 58 in the case of arm 40). Each of the members 178 and 180 has a flange 182 and 184 respectively at its outer end which mates with the corresponding flange on the top longitudinal member of the relevant scraper arm. Thus, flange 184 mates with the flange 162 of the top longitudinal member 158 of scraper arm 40 and flange 182 mates with a corresponding flange on arm 38. The mating flanges are coupled together by bolts (not shown).

The bottom longitudinal members 152 and 154 of scraper arm 40 are coupled to the corresponding members of arm 38 (one of which is visible at 186 in FIG. 1) by means of a coupling unit generally indicated at 188 in FIG. 3 which is welded to the underside of frame 53. Unit 188 includes two parallel tubes 190 and 192 which extend between the bottom longitudinal members of the two scraper arms and which have flanges 194 and 196 at their respective ends. These flanges are bolted to the corresponding flanges on the longitudinal members of the scraper arms. The two tubes 190 and 192 are welded to a vertically disposed sleeve 200.

As can best be seen in FIG. 1, in the assembled apparatus, coupling unit 188 is positioned around nozzle 24 at a spacing above the top surface of the bottom wall 70 of tank 20. The sleeve 200 of coupling unit 188 serves as a bearing housing for maintaining the scraper arms rotationally centered with respect to axis X—X. Referring back to FIG. 3, a bearing sleeve 206 is provided for mounting inside the sleeve 200 of coupling unit 188. Bearing sleeve 206 has an external diameter substantially less than the internal diameter of sleeve 200 and is held inside sleeve 200 by three bolts 208 which project inwardly through sleeve 200 in equiangularly spaced positions, and the inner ends of which bear against and frictionally retain bearing sleeve 206. The inner diameter of sleeve 206 is selected so that the sleeve is freely turnable on an inner metal sleeve 210 (see FIG. 1) welded around the external surface of the inner portion 24a of water inlet nozzle 24. Bearing sleeve 206 is made of an elastomeric bearing material sold under the trade mark THORDON and available from Thomson Gordon Limited of Hamilton, Ontario. It will be appreciated that, as eductor 46 is turned, the coupling unit 188, and with it bearing sleeve 206 will also turn with respect to nozzle 24 while the bearing arrangement represented by sleeves 206 and unit 188 will maintain the eductor and scraper arms centered with respect to axis X—X.

The clarifier reaction cone 44 is a sheet metal fabrication and is in fact in the shape of a pyramid having an octagonal base (see FIG. 2). At its upper end, the cone is supported by an octagonal sleeve 222 (FIG. 1) which is welded to the cone itself. At its upper end, sleeve 222 is fitted with angle section brackets (not shown) which in effect define a flange around the top of the sleeve and by which the sleeve is bolted to the main support beam 88. Guy rods, two of which are indicated in ghost outline at 228 and 230 in FIG. 1 also extend between beam 88 and the cone for stabilizing the cone. Each guy rod includes a turnbuckle (not shown) by which the length of the associated rod can be adjusted for adjusting the installed position of the cone.

The apparatus may include an array of conventional tube settlers disposed in tank 20 just below the level L of the liquid therein. However, since they are conventional, the tube settlers have not been shown.

To summarize, in the apparatus as described so far, mixing, coagulation, flocculation and gravity settling take place in the same tank, while at the same time, the extensive gentle turbulent mixing and sludge recirculating required for efficient coagulation and flocculation can be achieved. This is accomplished by taking advantage of the energy ordinarily available in the incoming liquid. Thus, the overall efficiency of the chemical treatment system is dependent on the combined efficiency of each of the individual unit process that make up the system (e.g. mixing, coagulation, flocculation and clarification). The system efficiency increases tremendously if the settled floc particles can be gently recirculated within the coagulation and flocculation zone. This action induces chemical coagulation and flocculation to take place on the surface of already formed floc to produce large, denser particles having better settling characteristics. The apparatus is designed to maximize the operating efficiency of each of the four basic unit processes which make up the overall chemical treatment system.

The relatively quiescent area (outside the reaction cone) allows for gravity settling and is designed for maximum utilization of conventional tube settlers (not shown) for efficient removal of pin point floc and production of a sparkingly clear effluent. In this area, not only does gravity settling take place, but also floc "blankets" tend to form as discussed previously which act to filter small floc particles from the water as it rises in passing to the launders. Also, the tube settlers provide for final removal of fine floc particles which have not already settled out by the time the water approaches the launders.

The action in the clarifier tank can be controlled for different influent flow rates and influent characteristics by adjusting the speed of the impeller 118 in the nozzle as discussed previously. Thus, the optimum mixing effect depends on the influent flow rate and on the amount of solids present in the liquid. Generally speaking, a more turbulent mixing action is required for liquids having a high solid content than for liquids containing less solids. In other words, the apparatus may also be adjustable according to the nature of the liquid being processed.

Reference will now be made to a further aspect of the invention in discussing the thickener tank 21 which is preferably integrally combined with the clarifier tank 20. Tank 21 is defined by an integral rectangular extension on one of the side walls 72 of the clarifier tank as can clearly be seen in FIG. 2; thus, the thickener tank 21 is closely associated with the clarifier tank. The thickener tank has a clarified liquid outlet 232 adjacent to an upper end of the tank, a sludge outlet 234 adjacent the lower end of the tank and through which settled sludge can be periodically removed from the apparatus, and an inlet 236 intermediate the outlets 232 and 234. Outlet 232 and hence also inlet 236 and outlet 234 are disposed below the normal liquid level L in the clarifier tank. A conduit 238 extends from the clarifier tank sump 36 to the thickener tank inlet 236 so that the head of liquid in the clarifier tank above sump 36 will cause sludge and liquid to continuously flow from the sump and into the thickener tank. The head will also cause clarified liquid to flow continuously from the thickener tank through outlet 232. A thickener device 240 is provided in the tank 21 for promoting thickening of influent sludge and liquid.

Essentially, the function of the thickener tank 21 is to increase the proportion of solids, and hence decrease the proportion of water in the waste effluent discharged from the apparatus. This effluent is discarded and the water discarded with the solid effluent is wasted. As the cost of water increases (as represented by the fees charged by municipal authorities supplying water) this loss in water represents a significant financial loss. It is believed that the thickener tank 21 will be effective in substantially decreasing this loss by reducing the proportion of waste water discarded. By way of example, in a typical conventional clarifier, the effluent from the sludge collection sump might contain, say, 0.5% solids and 99.5% water. It is believed that the thickener tank 21 may be effective in increasing the solids percentage to as high as 10%.

Referring to the drawings in more detail, it will be seen that thickener tank outlet 232 and inlet 236 open into respective launders 240 and 242 which extend around the internal surfaces of the side walls of the thickener tank and which are continuous. The influent conduit 238 takes the form of a pipe connected between inlet 236 and sump 36. It will be seen that, at the sump end, the pipe has an elbow 244 fitted with an extension pipe 246 having its inlet end disposed closely adjacent the bottom of the sump. This ensures that the sludge and liquid which flows from the sump at the highest available proportion of solids.

Thickener tank outlet 232 is fitted with an outlet pipe 248 which in the illustrated embodiment is connected into the raw water inlet pipe 22 to the clarifier tank. Thus, in use, sludge in tank 21 will be caused to thicken and the thickened sludge particles will tend to settle by gravity towards the bottom of the thickener tank. Clarified liquid can then be removed from adjacent the top of the tank through outlet 232 and can be re-introduced into the clarifier tank so as to maintain a closed circuit. In another embodiment, outlet 232 could be connected to a separate discharge from from the apparatus or into the clarifier launders 28.

A discharge pipe 250 is connected to the sludge outlet 234 of the thickener tank and is controlled by a valve 252. Periodically, valve 252 will be opened to withdraw thickened solids from the bottom of the thickener tank. This operation of removing solids is conventionally referred to as "blow down". In a typical clarifier, blow down of sludge may take place, say, for 20 seconds every five minutes and a similar cycle may be used for the thickener tank 21.

In this connection, it will be noted that blowing down of sludge from thickener 21 will have no effect on the flow from the main clarifier tank 20. This contrasts sharply with a conventional clarifier in which the settling action of the clarifier is interrupted during blow down. Thus, while sludge and liquid are being removed from the sludge collection sump of the clarifier the level of liquid in the clarifier falls with the result that discharge of clarified effluent stops. This does not happen when solids are blown down from the thickener tank 21.

A still further advantage of the arrangement shown in the drawings is that thickening or fixation chemicals can be introduced into the thickener tank for the purpose of causing waste effluent from the tank to solidify after it has been discharged. This addition of fixation chemicals can conveniently be carried out in the thickener tank without affecting the operation of the main clarifier tank. A suitable feed pipe may be connected into conduit 238, for example at the position indicated by arrow B in FIG. 1 for permitting introduction of chemicals.

The thickener device 240 in tank 21 is essentially of conventional form and comprises a thickener blade 254 in the form of a grid of vertical and horizontal wires carried by a vertical drive shaft 256 about which the blade turns. Shaft 256 is coupled at its upper end to an electric drive motor 258 carried by the main support beam 88 of the apparatus. Motor 258 turns shaft 256 at a relatively constant slow rate so as to cause the blade 254 to turn slowly in the tank. Movement of the wires of the grid which form the blade through the liquid have the effect of promoting flocculation and coagulation of particles in the liquid. The inner surface 260 of the bottom wall of thickener tank 21 is of inverted conical shape so that sludge will tend to migrate towards outlet 234. Blade 254 is of a shape complimentary to surface 260.

It will be appreciated that the preceding description relates to specific embodiments of the invention and that many modifications are possible within the broad scope of the invention. In particular, it should be noted that while the thickener tank 21 has been described and illustrated in association with one particular form of clarifier there is no limitation in this regard. Thickener tank 21 could be used in association with any appropriate form of clarifier, e.g. of conventional construction. Conversely, it is not essential to use the thickener tank with clarifier tank 20. The effluent from sump 36 could be discharged directly from clarifier tank 20 in a conventional fashion.

Further, while the specific description refers to a sludge scraper assembly, it is to be noted that other forms of sludge conveyor means may be employed. In another embodiment, a screw type sludge conveyor could be employed, for example, as disclosed in U.S. Pat. No. 4,005,019. Another possibility would be to use a slat-type chain conveyor as disclosed in the Tark U.S. patent discussed above.

With continued reference to the sludge removal means, it should also be borne in mind that it is not essential to employ a vertical drive shaft for operating the sludge conveyor. In the case of a slat-type conveyor, for example, no such shaft would be required. In other cases, a submersible motor could be employed for driving the sludge conveyor means.

In most applications of the apparatus, the influent liquid will be pumped to the apparatus at a velocity sufficient to ensure that liquid entering the tank will flow through the educator and recirculate as described. Thus, it is intended that the apparatus will ordinarily take advantage of the relatively high energy level imparted to the liquid by pumping equipment. However, in the event that the velocity of the liquid should be insufficient, it would of course be possible to provide auxiliary pumping means in association with the apparatus for achieving the required velocity. Also, it should be noted that the deflection baffle 112 is not essential. In an alternative embodiment the top of the clarifier reaction cone could be closed or fitted with means to laterally deflect liquid leaving the educator member. In other cases, no physical baffle may be needed.

Other detail modifications include the possibilities that tanks 20 and 21 may be made of steel and that the sludge scraper assembly may include one or more scraper arms. Also, tank 21 could be separate from tank 20 rather than being integrally combined therewith as shown. Tank 20 could be circular and tank 21 square.

Finally, it should be noted that the apparatus provided by the invention can be used not only for water purification, but also for removing suspended particles from other liquids, e.g. in the treatment of domestic sewage or industrial waste waters. The term "particles" is to be interpreted broadly as including not only solids but also colloidal suspensions.

I claim:

1. Liquid treatment apparatus comprising:
   a clarifier tank for containing a body of liquid extending to a predetermined liquid level in the tank;
   an inlet for liquid containing suspended particles;
   liquid outlet means disposed generally at said predetermined liquid level and through which clarified liquid can leave the tank;
   means in said tank for promoting settling of said particles from said liquid;
   a sump in a bottom wall of said tank for receiving settled particles in the form of a sludge;
   sludge conveyor means operable to convey settled particles towards said sump;
   a thickener tank closely associated with said clarifier tank and having a clarified liquid outlet adjacent an upper end of the tank, a sludge outlet adjacent a lower end of the tank through which settled sludge can be periodically removed from the apparatus, and an inlet intermediate said outlets, said inlet and outlets being below said predetermined liquid level in the clarifier tank;
   a conduit extending from said clarifier tank sump to said thickener tank inlet, whereby the head of liquid in the clarifier tank above the sump causes sludge and liquid to continuously flow from said sump into said thickener tank, and causes clarified liquid to flow continuously from said thickener tank liquid outlet;
   means in said thickener tank for promoting thickening of particles in liquid in the tank; and,
   means coupling said clarified liquid outlet of the thickener tank into one of said inlet and liquid outlet means of the clarifier tank.

2. Liquid treatment apparatus comprising:
   a tank for containing a body of liquid;
   a liquid inlet conduit through which liquid containing suspended particles can be delivered to the tank;
   liquid outlet means disposed generally at the level of the surface of said body of liquid and through which clarified liquid can leave the tank;
   sludge outlet means comprising a sump in a bottom wall of the tank for receiving settled particles and from which said particles can be removed as a sludge;
   sludge conveyor means operable to convey settled particles towards said sludge outlet means;
   a thickener tank closely associated with the first-mentioned tank and having a clarified liquid outlet adjacent its upper end, a sludge outlet adjacent its lower end through which settled sludge can be periodically removed from the apparatus, and an inlet intermediate said outlets, said inlets and outlets being below said level of the surface of the body of liquid in the first-mentioned tank;
   a conduit extending from said sump to said thickener tank inlet, whereby the head of liquid above said sump causes sludge and liquid to continuously flow from said sump into said thickener tank, and causes clarified liquid to flow continuously from said thickener tank liquid outlets; and, means in said thickener tank for promoting thickening of particles in liquid in the tank;

an inlet member disposed at an inner end of said liquid inlet conduit adjacent said bottom wall of the tank and arranged to direct influent liquid generally vertically upwards in the tank, said inlet member including generally co-axial inner and outer portions each of tubular form extending about a common axis and through which the liquid flows from end to end, said outer portion being of significantly greater cross-sectional area than said inner portion and defining a discharge end of said inlet, whereby some of the energy in liquid flowing through said inlet member is dissipated as the liquid flows from said inner end portion to said outer end portion;

static mixer means disposed in said inner portion of the inlet member;

feed means adapted to permit introduction of chemical additives into influent liquid immediately upstream of said static mixer;

a generally conical partition member disposed in the tank above said inlet and defining a circulation zone below said member, the remainder of the tank outside said partition member defining a relatively quiescent zone for gravity settling of suspended particles;

a tubular eductor member having open upper and lower ends and disposed in an upright position below said partition member and generally in alignment with said liquid inlet, said eductor member being arranged relative to said inlet so that liquid entering the tank from the inlet flows upwardly in said eductor member and through the open upper end of the member into said circulation zone, and liquid and suspended particles adjacent said open lower end of the eductor member are entrained by said upward flow of liquid, whereby a recirculation of liquid and suspended particles is established below said partition member for promoting flocculation of said particles;

rotary impeller means disposed adjacent said discharge end of said inlet in the path of liquid flowing through the inlet and adapted to control circulation of liquid and suspended particles in said circulation zone.

3. Apparatus as claimed in claim 2, wherein said rotary impeller means comprises a low-shear type impeller blade rotatable about said axis of the inlet member, a drive shaft extending upwardly through said eductor member and partition member to a level above the liquid level in the tank, and a variable speed drive means supported above said liquid level and coupled to said shaft for driving the impeller blade, whereby the speed of rotation of the blade can be adjusted according to mixing conditions required in the tank.

4. Apparatus as claimed in claim 3, further comprising a flow measuring device disposed in said influent liquid conduit and responsive to the flow rate of liquid in said conduit, and means coupled between said device and said mixer drive means for controlling the speed of rotation of said impeller blade according to the flow rate detected by said flow measuring device.

5. Apparatus as claimed in claim 2, wherein said static mixer means comprises a plurality of stationary mixer blades disposed in said inner end portion of the inlet and arranged to impart to liquid flowing therethrough, a turning action about the axis of the inlet.

6. Apparatus as claimed in claim 2, wherein said inner and outer portions of the inlet member are of cylindrical shape, and wherein the member further comprises an intermediate portion of part conical shape providing a smooth transition between said inner and outer portions.

7. Apparatus as claimed in claim 2, wherein said sump is offset from the centre of said bottom wall of the first-mentioned tank and is positioned in said wall adjacent said thickener tank.

8. Apparatus as claimed in claim 2, wherein said eductor member is shaped to define a throat immediately downstream of said discharge and of said inlet member, whereby the eductor member defines a venturi for entraining said liquid and suspended particles adjacent the open lower end of the eductor member.

9. Apparatus as claimed in claim 8, wherein said eductor member comprises an upper portion of substantially constant cross-sectional shape throughout its length, and a lower portion which is flared outwardly toward said open lower end of the member and which defines said throat with said upper portion, and a deflection baffle disposed above said open upper end of the upper section and arranged to laterally deflect liquid leaving the eductor member.

10. Apparatus as claimed in claim 2, wherein said sludge conveyor means forms part of a sludge scraper assembly rotatable in the tank about a generally vertical axis containing said liquid inlet, said scraper assembly including: scraper means for sweeping over said bottom wall of the tank as said assembly rotates and adapted to convey settled particles towards said sludge outlet; drive means supported above the level of said body of liquid for rotating said scraper means; and a driving member coupled to said drive means and extending down into the tank generally along said axis; said eductor member forming part of sludge scraper assembly and being coupled to said scraper means and said driving member and further including deflector means disposed above said open upper end of the eductor member and arranged to outwardly deflect liquid leaving said member; and wherein the apparatus further comprises means for rotationally locating said scraper assembly with respect to said vertical axis.

11. Apparatus as claimed in claim 10, wherein said rotary impeller means comprises a low-shear type impeller blade rotatable about said axis of the inlet member, a drive shaft extending upwardly from said blade through said eductor member and partition member to a level above said liquid in the tank, and variable speed drive means disposed above said liquid level and coupled to said drive shaft, and wherein said driving member of the sludge scraper assembly is of tubular form and said mixer drive shaft extends longitudinally through said driving member from said drive means to said impeller blade.

12. Apparatus as claimed in claim 10, wherein said inner portion of the inlet member is of cylindrical shape, and wherein said means for rotationally locating the scraper assembly comprises bearing means turnably mounted on said inner portion at the inlet member, and bearing housing means carried by said eductor member and housing said bearing means.

13. An apparatus as claimed in claim 1 or 2 wherein said thickener tank is separate from said tank for containing a body of liquid.

14. An apparatus as claimed in claim 1 or 2 wherein said thickener tank is integral with said tank for containing a body of liquid and is formed by an integral extension of a side wall of said tank.

15. In a liquid treatment apparatus which includes a clarifier tank for containing a body of liquid extending to a predetermined liquid level in the tank; an inlet for liquid containing suspended particles; liquid outlet means disposed generally at said predetermined liquid level and through which clarified liquid can leave the tank; means in said tank for promoting settling of said particles from said liquid; a sump in a bottom wall of said tank for receiving settled particles in the form of a sludge; sludge conveyor means operable to convey settled particles towards said sump;

the improvement comprising a thickener tank and having a clarified liquid outlet adjacent an upper end of the tank, a sludge outlet adjacent a lower end of the tank, through which settled slude can be periodically removed from the apparatus, and an inlet intermediate said outlets, said inlet and outlets being below said predetermined liquid level in the clarifier tank;

a conduit extending from said clarifier tank sump to said thickener tank inlet, whereby the head of liquid in the clarifier tank above the sump causes sludge and liquid to continuously flow from said sump into said thickener tank, and causes clarified liquid to flow continuously from said thickener tank liquid outlet;

means in said thickener tank for promoting thickening of particles in liquid in the tank; and, means coupling said clarified liquid outlet of the thickener tank into one of said inlet and liquid outlet means of the clarifier tank.

\* \* \* \* \*